(12) United States Patent
Yoshida et al.

(10) Patent No.: US 7,502,296 B2
(45) Date of Patent: Mar. 10, 2009

(54) INFORMATION RECORDING MEDIUM, INFORMATION RECORDING AND REPRODUCING APPARATUS, INFORMATION RECORDING METHOD AND INFORMATION RECORDING PROGRAM

(75) Inventors: Masayoshi Yoshida, Saitama (JP); Takeshi Koda, Saitama (JP); Keiji Katata, Saitama (JP)

(73) Assignee: Pioneer Corporation, Tokyo (JP)

( * ) Notice: Subject to any disclaimer, the term of this patent is extended or adjusted under 35 U.S.C. 154(b) by 496 days.

(21) Appl. No.: 10/933,475

(22) Filed: Sep. 3, 2004

(65) Prior Publication Data

US 2005/0099905 A1 May 12, 2005

(30) Foreign Application Priority Data

Sep. 5, 2003 (JP) .............................. 2003-314737

(51) Int. Cl.
*G11B 7/0045* (2006.01)

(52) U.S. Cl. ................................. 369/59.25; 369/47.21

(58) Field of Classification Search ............... 369/59.25, 369/47.15, 47.21, 47.1
See application file for complete search history.

(56) References Cited

U.S. PATENT DOCUMENTS

| 5,068,842 | A | * | 11/1991 | Naito | ....................... 369/30.07 |
| 6,189,118 | B1 | * | 2/2001 | Sasaki et al. | ................. 714/710 |
| 6,760,288 | B2 | * | 7/2004 | Ijtsma et al. | ............. 369/53.18 |
| 6,885,623 | B1 | * | 4/2005 | Oishi et al. | ............... 369/53.37 |
| 2003/0095484 | A1 | * | 5/2003 | Motohashi | ................ 369/53.15 |
| 2003/0137910 | A1 | * | 7/2003 | Ueda et al. | ................ 369/47.14 |
| 2003/0169660 | A1 | * | 9/2003 | Shirai et al. | .............. 369/53.21 |
| 2004/0042370 | A1 | * | 3/2004 | Sugimura et al. | ......... 369/59.25 |

FOREIGN PATENT DOCUMENTS

| JP | 5-109240 | A | 4/1993 |
| JP | 7-302485 | A | 11/1995 |
| JP | 2002-238015 | * | 8/2002 |
| JP | 2002-238015 | A | 8/2002 |

* cited by examiner

*Primary Examiner*—Wayne R Young
*Assistant Examiner*—Thomas D Alunkal
(74) *Attorney, Agent, or Firm*—Sughrue Mion, PLLC

(57) ABSTRACT

As an information recording medium, an optical disc such as a DVD-R and the like, is applicable. The optical disc has a recording structure which includes a lead-in area, a lead-out area and a user data area. The lead-in area includes control information area having control information data, such as an address of recording data. Moreover, the control information area includes a predetermined remaining quantity area. Until recorded control information data does not reach the predetermined remaining quantity area, when the data is recorded on the optical disc, the newest control information data is additionally recorded in the control information area every time the optical disc is ejected. On the other hand, after the control information data reaches the predetermined remaining quantity area, the newest control information data is additionally recorded in the control information area only when additional recording data larger than a predetermined quantity is recorded. Therefore, the consumption of recording capacity of the control information area can be suppressed, and the newest information can be immediately obtained when the recording medium is inserted.

7 Claims, 6 Drawing Sheets

INFORMATION RECORDING MEDIUM, INFORMATION RECORDING AND REPRODUCING APPARATUS, INFORMATION RECORDING METHOD AND INFORMATION RECORDING PROGRAM

BACKGROUND OF THE INVENTION

1. Field of the Invention

The present invention relates to an information recording medium, an information recording and reproducing apparatus which records or reproduces information on or from the information recording medium, an information recording method which records the information and an information recording program.

2. Description of Related Art

There are known an information recording medium, such as an optical disc and the like, represented by a DVD-R (DVD-Recordable) and a DVD-RW (DVD-Re-recordable), and an information recording and reproducing apparatus capable of recording information on the information recording medium and reproducing the recorded information. So far, since physically re-writing data is impossible on an additionally-recordable-type recording medium capable of recording only once, such as a CD-R and a DVD-R, old file management information (hereafter, it is called "control information data") remains, and new control information data is additionally recorded for each recording of new data. Further, the control information data is generally updated when the recording medium is ejected. This is because the control information data can be additionally recorded for each recording of the new data, and the newest control information data can be immediately obtained when the recording medium is inserted at next time. However, since the old control information data remains by such an additional recording method of the control information data, storage capacity of the information recording medium is wasted.

Therefore, for example, in a technique which is disclosed in Japanese Patent Application Laid-open under No. 2002-238015, only when a predetermined quantity of the data is recorded irrespective of an operation of ejecting the recording medium, the control information data is updated, and thereby the consumption of recording capacity used for the control information data is suppressed.

However, by the above-mentioned additional recording method of the data, since the control information data is updated only when the predetermined quantity of the data is recorded irrespective of the operation of ejecting the disc, the newest control information data is not updated in most cases (i.e., because the recorded data does not always reach the quantity larger than the predetermined quantity) when the data is recorded and ejected. Therefore, when the disc is inserted at next time, the information which is not the newest is obtained in the first place, and the control information data is updated to be the newest one after an actual area searching and the like are performed. Thus, it problematically takes a long time for setup after insertion of the disc.

SUMMARY OF THE INVENTION

The present invention has been achieved in order to solve the above problems. It is an object of this invention to record control information in such a way to suppress consumption of recording capacity of a control information area in which control information data is recorded at the time of recording the control information on a recording medium, specially, on an additionally-recordable-type recording medium capable of recording only once, and to immediately obtain the newest control information when the recording medium is inserted at next time.

According to one aspect of the present invention, there is provided an information recording medium including a data area in which data is recorded, a control information area in which plural control information data for controlling reproduction of the recorded data is recorded in sequence, and a predetermined remaining quantity area, which is provided in the control information area, having data recording capacity corresponding to a predetermined quantity of the control information data.

As the above-mentioned information recording medium, the optical disc, such as a DVD-R and a DVD-RW, is applicable. The information recording medium may include the data area (hereafter, it is also called "user data area") which records the information, such as image data, sound data, contents data, a computer program and the like. Further, the information recording medium includes the control information area which records plural control information data for controlling the recorded information in sequence. For example, in sequential recording, an LRA (Last Recorded Address) indicating an address recorded last may be used as the control information data. When the recording medium is ejected, the recording operation of the control information data is performed. In addition, the control information area includes the predetermined remaining quantity area having the recording capacity which is determined based on the predetermined quantity of the control information data which is preset. The predetermined remaining quantity area is used for determining whether to additionally record the control information data or not. Concretely, when the control information data does not reach the predetermined remaining quantity area, the newest control information data is recorded in the control information area at every time of the ejection of the disc. Namely, when the information is recorded on the recording medium, the control information data is always recorded. Therefore, when the information recording medium is inserted next, the newest control information can be immediately obtained. On the other hand, after the control information data reaches the predetermined remaining quantity area, the control information data is recorded in the control information area only when the predetermined quantity of the data is recorded. Thereby, the useless consumption of the storage capacity of the control information area on the information recording medium can be suppressed.

In a preferred embodiment, newest control information data may be recorded in the control information area, other than the predetermined remaining quantity area, in response to an instruction of ejecting the information recording medium, and the newest control information data may be recorded in the predetermined remaining quantity area in response to recording of predetermined quantity of the data in the data area. By repeating the operation of additional recording of the newest control information data at every time of the instruction of ejecting the information recording medium, a recording end position of the control information data finally reaches the predetermined remaining quantity area. Afterward, the newest control information is recorded in response to the recording of the predetermined quantity of the data in the data area, and thereby effective use of the control information area is possible.

In another preferred embodiment, the data recording capacity in the predetermined remaining quantity area may be equal to or larger than a total data quantity of the control information data recorded in the control information area, when an operation of recording the control information data in the control information area every time a predetermined capacity of data is recorded is performed to a whole unrecorded area in the data area after recording of the plural control information data reaches the predetermined remaining quantity area.

The recording capacity of the predetermined remaining quantity area may be set to a value larger than a value obtained by multiplying the recording capacity of the control information data recorded at one time by a value which is obtained by dividing the recording capacity of the data area by the predetermined recording capacity set to an additional recording data (i.e., a number of possible additional recording). Thereby, after the recorded control information data reaches the predetermined remaining quantity area, even when the data is recorded up to the end of the remaining area of the data area, the correspondent control information data can be recorded in the control information area.

According to another aspect of the present invention, there is provided an information recording apparatus which records information on an information recording medium including a data area in which data is recorded, and a control information area in which control information data for controlling reproduction of the data recorded in the data area is recorded, the control information area including a predetermined remaining quantity area having data recording capacity corresponding to a predetermined quantity of the control information data, the information recording apparatus includes: a data recording unit which records data in the data area; and a control information data recording unit which records, in the control information area, control information data corresponding to the data recorded in the data area, wherein the control information data recording unit records newest control information data in the control information area in response to an instruction of ejecting the information recording medium, until recording of the control information data reaches the predetermined remaining quantity area.

The above-mentioned information recording apparatus may record the information, such as the image data and the contents, on the information recording medium, such as the DVD-R and the DVD-RW, and can further read out the control information data written on the information recording medium for controlling the recording. In the embodiment of the present invention, the information recording apparatus can obtain the control information data which is recorded on the information recording medium, and can further record the newest control information data on the basis of the predetermined remaining quantity area provided in the control information area and the above control information data. Until the obtained control information data reaches the predetermined remaining quantity area, the newest control information data is recorded in response to the instruction of ejecting the information recording medium. Since the control information data corresponding to all the recording data is recorded, the newest information can be immediately obtained when the information recording medium is inserted next, and it does not take a long time for setup.

In a preferred embodiment, the information recording apparatus may record, in the control information area, the newest control information data every time the data recording unit records the data larger than the predetermined quantity in the data area, after the control information data reaches the predetermined remaining quantity area. Thereby, after the recording of the control information data reaches the predetermined remaining quantity area, the consumption of the storage capacity of the control information area can be suppressed by not recording the control information data corresponding to the data of the small recording capacity smaller than the predetermined quantity.

In another preferred embodiment, the control information data recording unit may cancel recording of the control information data when the control information data recorded on the information recording medium is the newest at the time of ejecting the information recording medium. The case that the control information data recorded on the information recording medium is the newest is a situation that no new information is recorded on the information recording medium. In the case, since the recording of the control information data is unnecessary, the recording operation is not performed even if the information recording medium is ejected.

According to still another aspect of the present invention, there is provided an information recording method of recording information on an information recording medium including a data area in which data is recorded, and a control information area in which control information data for controlling reproduction of the data recorded in the data area is recorded, the control information area including a predetermined remaining quantity area having data recording capacity corresponding to a predetermined quantity of the control information data, the information recording method includes: a data recording process which records the data in the data area; and a control information data recording process which records, in the control information area, the control information data corresponding to the data recorded in the data area. By the information recording method, until the recording of the control information data reaches the predetermined remaining quantity area, the newest control information data is recorded in the control information area in response to the instruction of ejecting the information recording medium. By the information recording method, the control information data can also be recorded, identically to the above-mentioned information recording apparatus.

According to still another aspect of the present invention, there is provided a computer program product in a computer-readable medium executed by an information recording apparatus to record information on an information recording medium including a data area in which data is recorded, and a control information area in which control information data for controlling reproduction of the data recorded in the data area is recorded, the control information area including a predetermined remaining quantity area having data recording capacity corresponding to a predetermined quantity of the control information data, the computer program product in the computer-readable medium includes: a data recording unit which records the data in the data area; and a control information data recording unit which records, in the control information area, the control information data corresponding to the data recorded in the data area. By the computer program product in the computer-readable medium, until the recording of the control information data reaches the predetermined remaining quantity area, the newest control information data is recorded in the control information area in response to the instruction of ejecting the information recording medium. By executing the computer program product in the computer-readable medium, the control information data can also be recorded, identically to the information recording apparatus.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

[Information Recording Medium]

1st Embodiment

Figure 1:
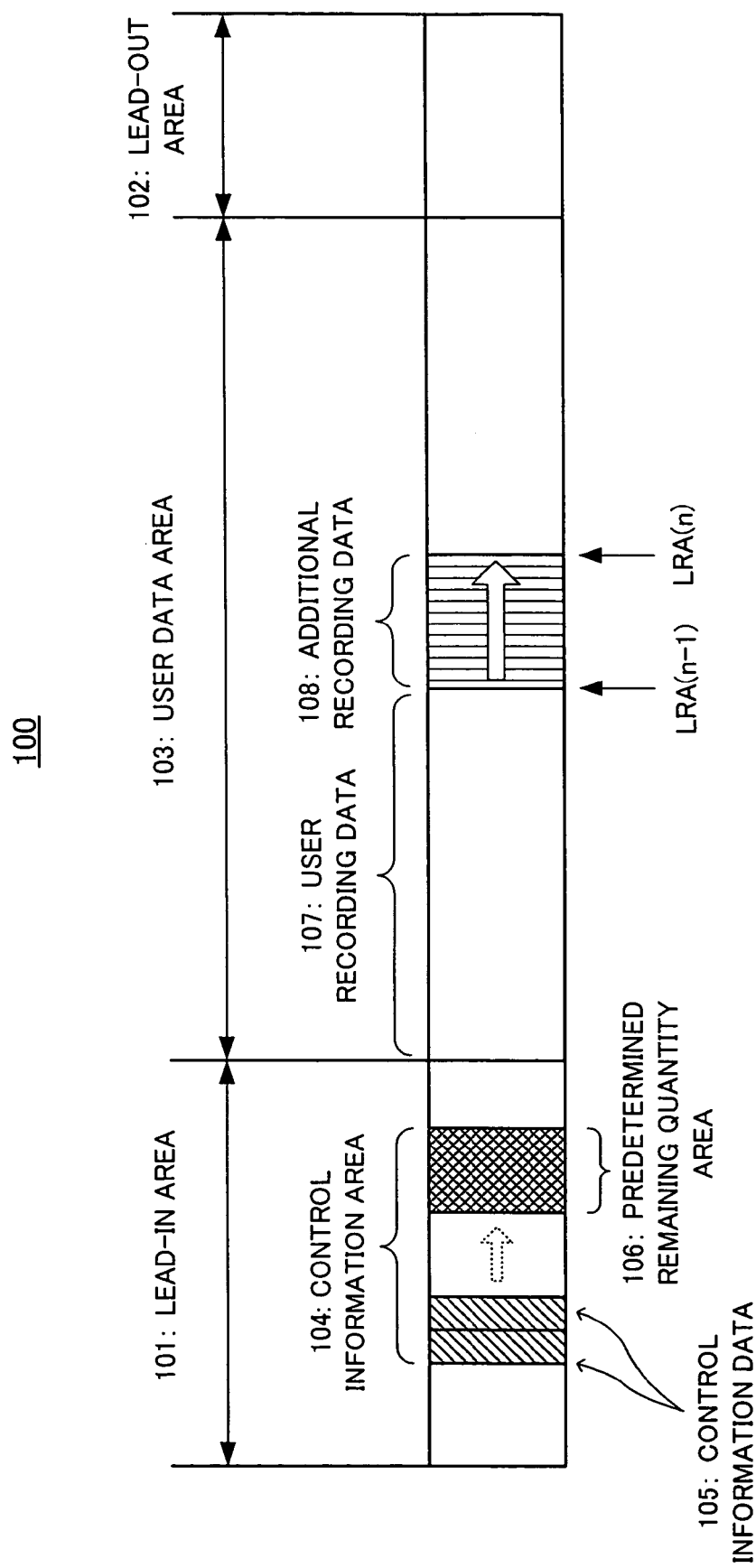
FIG. 1 is a diagram showing a recording structure of an information recording medium according to a first embodiment of the present invention.

First, the description will be given of the information recording medium according to a first embodiment of the present invention. FIG. 1 shows a recording structure of an optical disc 100 being the information recording medium according to the first embodiment and recorded information. In FIG. 1, the left side is an inner side of the optical disc 100, and the right side is an outer side of the optical disc 100. The explanation will be given below by assuming the DVD-R being the additionally-recordable-type recording medium capable of recording the recording data only once as the optical disc 100.

As shown in FIG. 1, on a recording surface of the optical disc 100, a lead-in area 101 exists inside, a user data area 103 exists outside the lead-in area 101, and a lead-out area 102 exists outside the user data area 103.

The user data area 103 is an area for recording the recording data. The recording data is subjected to reproducing or executing, such as image data, sound data, contents data, a computer program and the like. The recording data is recorded from the left side to the right side in FIG. 1 (i.e., from inside to outside of the optical disc 100). In the user data area 103, user recording data 107, which includes plural data recorded by the recording apparatus and the like before, and an additional recording data, which is the newest data currently recorded, are recorded.

The first embodiment has the recording structure that the lead-in area 101 includes the control information area. For example, on the optical disc for which a blue laser beam is used, the control information area 104 is recorded in a predetermined area which is provided in the lead-in area 101 or the lead-out area 102 on the disc. FIG. 1 shows an example that the lead-in area 101 includes the control information area 104. As shown in FIG. 1, the control information area 104 includes a front end portion, where recording 6f control information data 105 starts, and a back end portion, where the recording of the control information data 105 ends. The control information area 104 is an area for recording the plural control information data 105, such as the address of the data recorded in the user data area 103. For example, in the sequential recording, the LRA (Last Recorded Address) indicating the address which is recorded last is an example of the control information data 105. Similarly to the user data area 103, from inside to outside of the optical disc 100, the control information data 105 is additionally recorded for each recording of the new data in the user data area 103. For example, in FIG. 1, when an additional recording data 108 is recorded from a position of an LRA(n−1) to a position of an LRA (n), the newest control information data 105 indicating that the data is recorded up to the position of the LRA(n) is recorded in the control information area 104.

In the present embodiment, the above-mentioned control information area 104 includes a predetermined remaining quantity area 106 having the data recording capacity corresponding to the predetermined quantity of the control information data 105. As shown in FIG. 1, the predetermined remaining quantity area 106 is provided in the control information area 104 from its back end portion to its front end portion.

Now, the description will be schematically given of a recording process which is executed by using the above-mentioned predetermined remaining quantity area 106. In the embodiment of the present invention, until the recording of the control information data 105 reaches the predetermined remaining quantity area 106, the newest control information data 105 is recorded in the control information area 104 in response to the instruction of ejecting the optical disc 100. Namely, even when the recording capacity of the recorded additional recording data 108 is smaller than the predetermined quantity, all the correspondent control information data 105 is recorded in the control information area 104. Thereby, since the control information data 105 is recorded every time when the data is recorded on the optical disc 100, the newest control information data 105 can be immediately obtained when the optical disc 100 is inserted at next time.

On the other hand, after the control information data 105 reaches the predetermined remaining quantity area 106, the newest control information data 105 is recorded in the control information area 104 only when the recording capacity of the additional recording data 108 is larger than the predetermined quantity. In the case, when the data quantity of the recorded additional recording data 108 is smaller than the predetermined quantity, the correspondent control information data 105 is not recorded in the control information area 104. Thereby, the useless consumption of the storage capacity of the control information area 104 can be suppressed.

In addition, even when the control information data 105 does not reach the predetermined remaining quantity area 106, if the optical disc 100 is only inserted and ejected into and from the recording apparatus and the like without being recorded, the control information data 105 is not recorded.

The data recording capacity of the predetermined remaining quantity area 106 is determined to be larger than the total data quantity of the control information data 105 which are recorded in the control information area 104, when the operation of recording one control information data 105 in the control information area 104 every time a predetermined capacity of additional recording data 108 is recorded is performed with respect to the unrecorded area of the user data area after the plural control information data 105 reach the predetermined remaining quantity area 106 as described above. Concretely, the recording capacity of the predetermined remaining quantity area 106 is set to the value equal to or larger than a value, which is obtained by multiplying the recording capacity of the control information data 105 recorded at one time by a value which is obtained by dividing the recording capacity of the user data area 103 by the predetermined recording capacity set to the additional recording data 108 (i.e., the number of possible additional recording). However, it is not necessary to set the recording capacity larger than the above-mentioned calculated recording capacity, because if the predetermined remaining quantity area 106 is set to be larger, it takes a longer time to search the newest control information data 105.

2nd Embodiment

Figure 2:
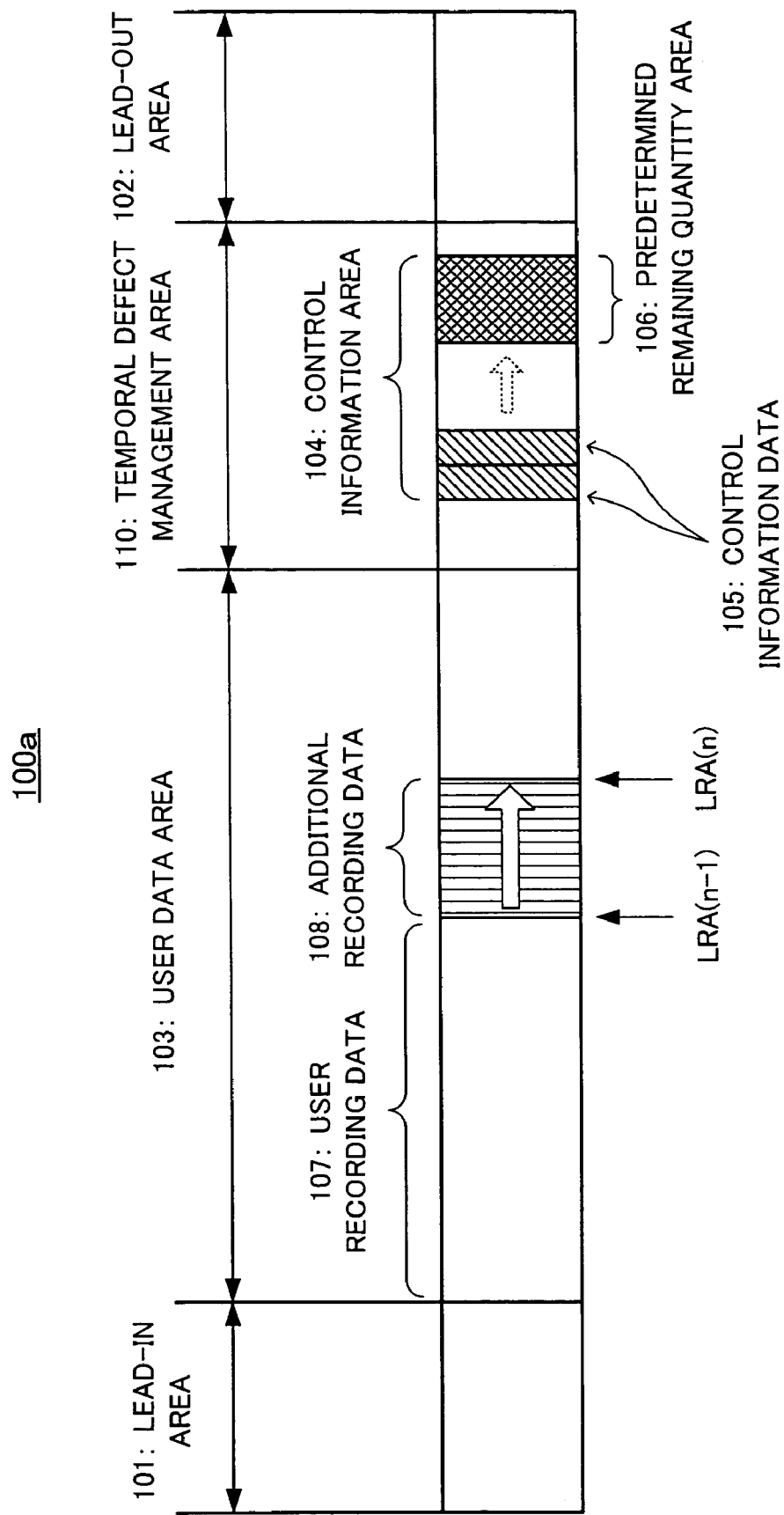
FIG. 2 is a diagram showing a recording structure of an information recording medium according to a second embodiment of the present invention.

Next, the description will be given of the information recording medium according to a second embodiment. FIG. 2 explains a recording structure of an optical disc 100a being the information recording medium according to the second embodiment and recorded information. It is noted that the left side is an inner side of the optical disc 100a, and the right side is an outer side of the optical disc 100a in FIG. 2.

As shown in FIG. 2, on a recording surface of the optical disc 100a, the lead-in area 101 exists inside, the user data area 103 exists outside the lead-in area 101, a temporal defect management area 110 exists outside the user data area 103, and the lead-out area 102 exists outside the temporal defect management area 110. Though the temporal defect management area 110 is provided between the user data area 103 and the lead-out area 102 in the example of FIG. 2, the temporal defect management area 110 may be provided between the lead-in area 101 and the user data area 103 instead. In addition, the temporal defect management area 110 may be provided within the lead-in area 101 or in the lead-out area 102.

The user data area 103 is an area in which the recording data is recorded. The recording data is subjected to reproducing or executing, such as the image data, the sound data, the contents data, the computer program and the like. The information to be recorded is recorded from the left side to the right side (i.e., from inside to outside of the optical disc 100a) in FIG. 2. In the user data area 103, the user recording data 107, which includes the plural data recorded by the recording apparatus and the like before, and the additional recording data 108, which is the newest data currently recorded, are recorded.

The second embodiment is different from the first embodiment, in that the second embodiment has the data structure that the temporal defect management area 110 includes the control information area 104. The temporal defect management area 110 is an area which is used for the defect management system. The defect management system is a technique which is performed for improving reliability of recording and reading out of the recording data in a high-density recording medium, such as the optical disc, a magnetic disc, a magneto-optical disc and the like. Namely, when a flaw, dust or deterioration of the recording medium (they are generally called "defects") exist on the recording medium, the data recorded or to be recorded at the position at which the defect exists is recorded in other area (not shown) on the recording medium (hereafter, it is called "spare area"). Like this, by moving the recording data which may become unrecordable or unreadable by the defect to the spare area, the reliability of recording and reading out of the recording data can be improved. In the temporal defect management area 110, address information indicating the position of the defect existing on the optical disc 100a, and address information indicating the position in the spare area to which the data recorded or to be recorded at the position at which the defect exists is moved (e.g., a recording position in the spare area) are recorded.

The above-mentioned temporal defect management area 110 includes the control information area 104. In the control information area 104, the plural control information data 105 is recorded, and the predetermined remaining quantity area 106 is also provided. The process identical to the process in the first embodiment is executed to the control information area 104 including them. Namely, until the recording of the control information data 105 reaches the predetermined remaining quantity area 106, the newest control information data 105 is recorded in the control information area 104 in response to the instruction of ejecting the optical disc 100a. In addition, after the control information data 105 reaches the predetermined remaining quantity area 106, the newest control information data 105 is recorded in the control information area 104 only when the recording capacity of the additional recording data 108 is larger than the predetermined quantity. Further, even when the control information data 105 does not reach the predetermined remaining quantity area 106, if the optical disc 100a is only inserted and ejected into and from the recoding apparatus and the like without being recorded, the control information data 105 is not recorded in the control information area 104.

It is noted that the recording capacity of the predetermined remaining quantity area 106 can be set by the method identical to the method in the above-mentioned first embodiment.

[Information Recording and Reproducing Apparatus]

The information recording and reproducing apparatus according to the present invention will be explained below.

Figure 3:
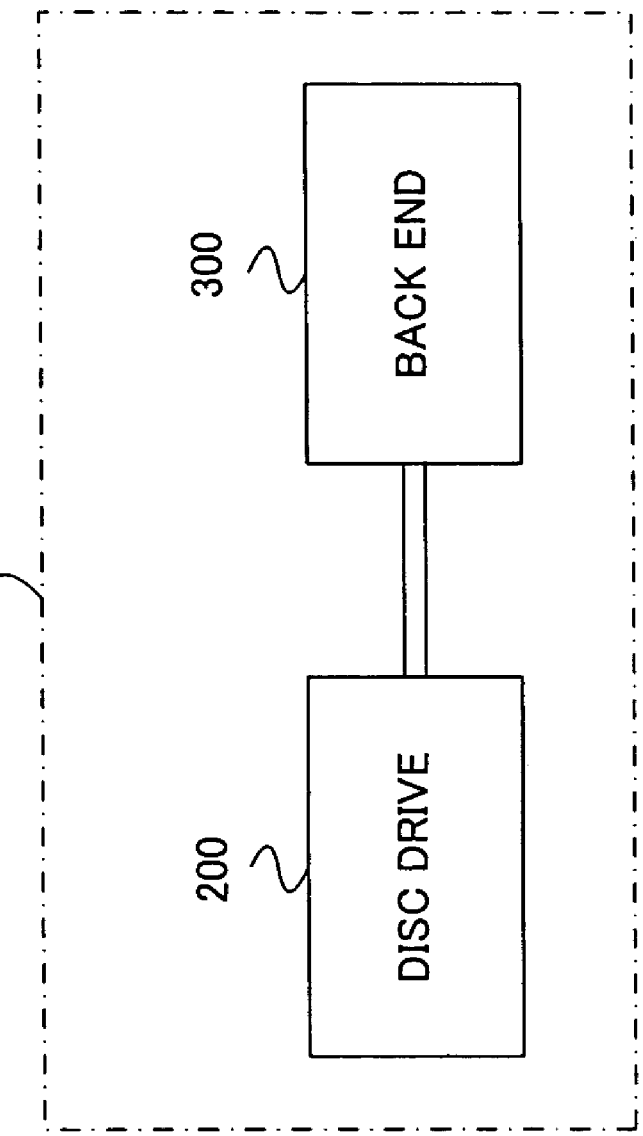
FIG. 3 is a block diagram of an information recording and reproducing apparatus being an embodiment of the present invention.

First, a configuration of an information recording and reproducing apparatus 400 will be explained. FIG. 3 shows the information recording and reproducing apparatus 400 which is the embodiment of the present invention. The information recording and reproducing apparatus 400 has two functions: a function of recording information on the recording medium, and a function of reproducing the information recorded on the recording medium. Concretely, the information recording and reproducing apparatus 400 can reproduce information from a disc for recording and reproducing, such as the DVD-R, the DVD-RW and the like, and can record the information on the disc for recording and reproducing. In addition, the information recording and reproducing apparatus 400 can also reproduce a disc dedicated to reproducing, such as a DVD-ROM, a DVD video, a DVD audio and the like. The information recording and reproducing apparatus 400 includes a disc drive 200 and a back end 300.

Figure 4:
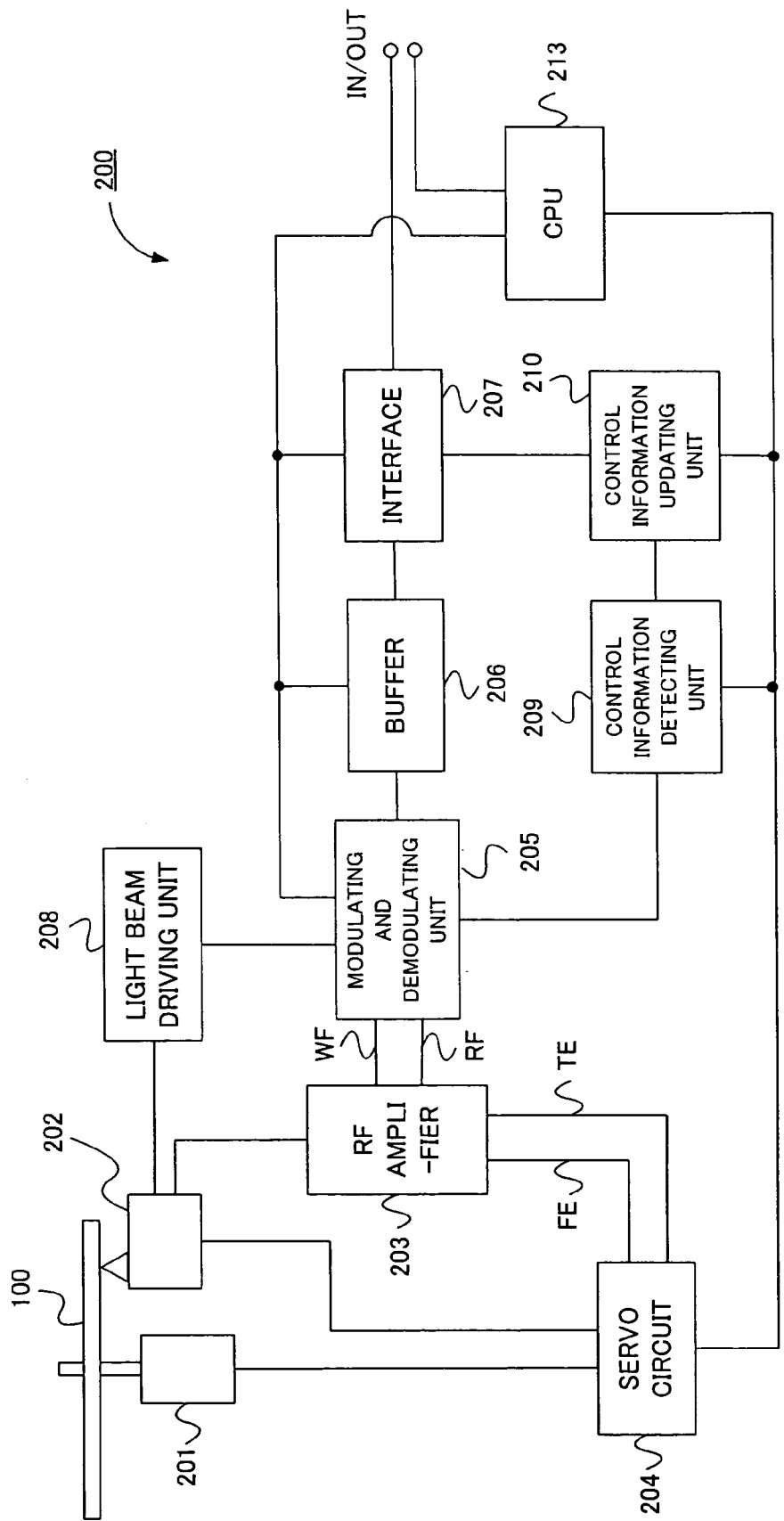
FIG. 4 is a block diagram showing a disc drive of the information recording and reproducing apparatus shown in FIG. 3.

FIG. 4 shows an inside configuration of the disc drive 200. The disc drive 200 records the information on the optical disc 100, and reads out the information which is recorded on the optical disc 100. The optical disc 100 is one of the above-mentioned disc for recording and reproducing or the above-mentioned disc dedicated to reproducing.

As shown in FIG. 4, the disc drive 200 includes a spindle motor 201, an optical pickup 202, an RF amplifier 203 and a servo circuit 204. They mainly configure a driving system of the disc drive 200 and a driving control unit thereof.

The spindle motor 201 rotates the optical disc 100.

The optical pickup 202 outputs an RF signal corresponding to a reflected light of a light beam at the time of recording and reading out the information. When the optical disc 100 adopts a wobbled land/groove system, control information, such as wobbling, lands, grooves, prepits and the like, is included in the RF signal because the wobbled lands and grooves, the prepits and the like are formed in advance on the recording surface of the optical disc 100. Moreover, when information is already recorded on the optical disc 100, the recorded information is incorporated in the RF signal, too.

The RF amplifier 203 amplifies the RF signal outputted from the optical pickup 202, and outputs the RF signal to a modulating and demodulating unit 205. Further, the RF amplifier 203 generates a wobble frequency signal WF, a tracking error signal TE, a focus error signal FE and the like from the RF signal, and outputs them.

The servo circuit 204 is a servo control circuit which controls the driving of the optical pickup 202 and the spindle motor 201 on the basis of the tracking error signal TE, the focus error signal FE and the other servo control signal. Concretely, the servo circuit 204 controls a position relation between the optical pickup 202 and the optical disc 100 on the basis of the tracking error signal TE. The servo circuit 204 controls focusing of the light beam of the optical pickup 202 on the basis of the focus error signal FE.

Moreover, as shown in FIG. 4, the disc drive 200 includes the modulating and demodulating unit 205, a buffer 206, an interface 207 and a light beam driving unit 208. They mainly demodulates and outputs the recorded information which is read out from the optical disc 100, and receives and modulates the recording information to be recorded on the optical disc 100.

The modulating and demodulating unit 205 is a circuit which has two functions: a function of performing error correction of the recording information at the time of reading out the information, and a function of adding an error correction code to the recording information at the time of recording the information and modulating it. Concretely, at the time of reading out the information, the modulating and demodulating unit 205 demodulates the RF signal outputted from the RF amplifier 203, and performs the error correction to it to output it to the buffer 206. In addition, at the time of recording the information, the modulating and demodulating unit 205 adds the error correction code to the recording information outputted from the buffer 206, and modulates it so as to be adapted to the optical identification of the optical disc 100. Afterward, the modulated recording information is outputted to the light beam driving unit 208.

The buffer 206 is a storing circuit which temporally stores the recording information.

The interface 207 is a circuit which performs input and output control or communication control of the recording information between the disc drive 200 and the back end 300. Concretely, at the time of reproducing the information, the interface 207 outputs, to the back end 300, the recording information outputted from the buffer 206 (i.e., the recording information which is read out from the optical disc 100), in response to a request command from the back end 300. In addition, at the time of recording the information, the interface 207 receives the recording information inputted from the back end 300 to the disc drive 200, and outputs it to the buffer 206.

Further, the disc drive 200 includes a control information detecting unit 209 and a control information updating unit 210, as shown in FIG. 4.

The control information detecting unit 209 detects the control information data 105 which is recorded in the control information area 104 on the optical disc 100. The detected control information data 105 includes the LRA indicating the address which is recorded last in sequential recording and the like, and the newest recorded data can be read out on the basis of the LRA. Moreover, in the present invention, by determining whether the detected control information data 105 reaches the predetermined remaining quantity area 106 or not, a CPU 213 which will be explained later executes the recording process of the control information data 105.

The control information updating unit 210 additionally records the newest control information data 105 in the control information area 104. The control information updating unit 210 additionally records the control information data 105 in response to the instruction of ejecting the optical disc 100 until the recording of the control information data 105 reaches the predetermined remaining quantity area 106, as described above. On the other hand, after the control information data 105 reaches the predetermined remaining quantity area 106, the control information updating unit 210 records the newest control information data 105 only when the data larger than the predetermined quantity is recorded in the data area 103.

The CPU 213 controls the whole disc drive 200, and controls and manages the above-mentioned transmission of the information among respective components in the disc drive 200. For example, in the present invention, the CPU 213 determines whether to record the newest control information data 105 or not, on the basis of the control information data 105 which the control information detecting unit 209 detects. Concretely, when the control information data 105 does not reach the predetermined remaining quantity area 106, the CPU 213 records the control information data 105 in response to the instruction of ejecting the optical disc 100. On the other hand, when the control information data 105 reaches the predetermined remaining quantity area 106, only in a case that the additional recording data 108 has the recording capacity larger than the predetermined quantity, the CPU 213 records the control information data 105 in response to the instruction of ejecting the optical disc 100.

In addition, the CPU 213 can determine whether the optical disc 100 is inserted and ejected or not without do anything, and does not record the control information data 105 in the case. Moreover, in response to the request command transmitted from the back end 300 which will be described later, the CPU 213 controls an operation of reading out by the optical pickup 202 and an output of the recorded information stored in the buffer 206 to the back end 300. Thereby, the CPU 213 can also execute normal reproducing control and first-reading control of the contents information.

Next, the description will be given of an inside configuration of the back end 300 shown in FIG. 5. The back end 300 performs a reproducing process of the recording information which is read out from the optical disc 100 by the disc drive 200. Also, the back end 300 receives the recording information which is supplied from outside in order to be recorded on the optical disc 100, and compresses (encodes) and transmits it to the disc drive 200.

Figure 5:
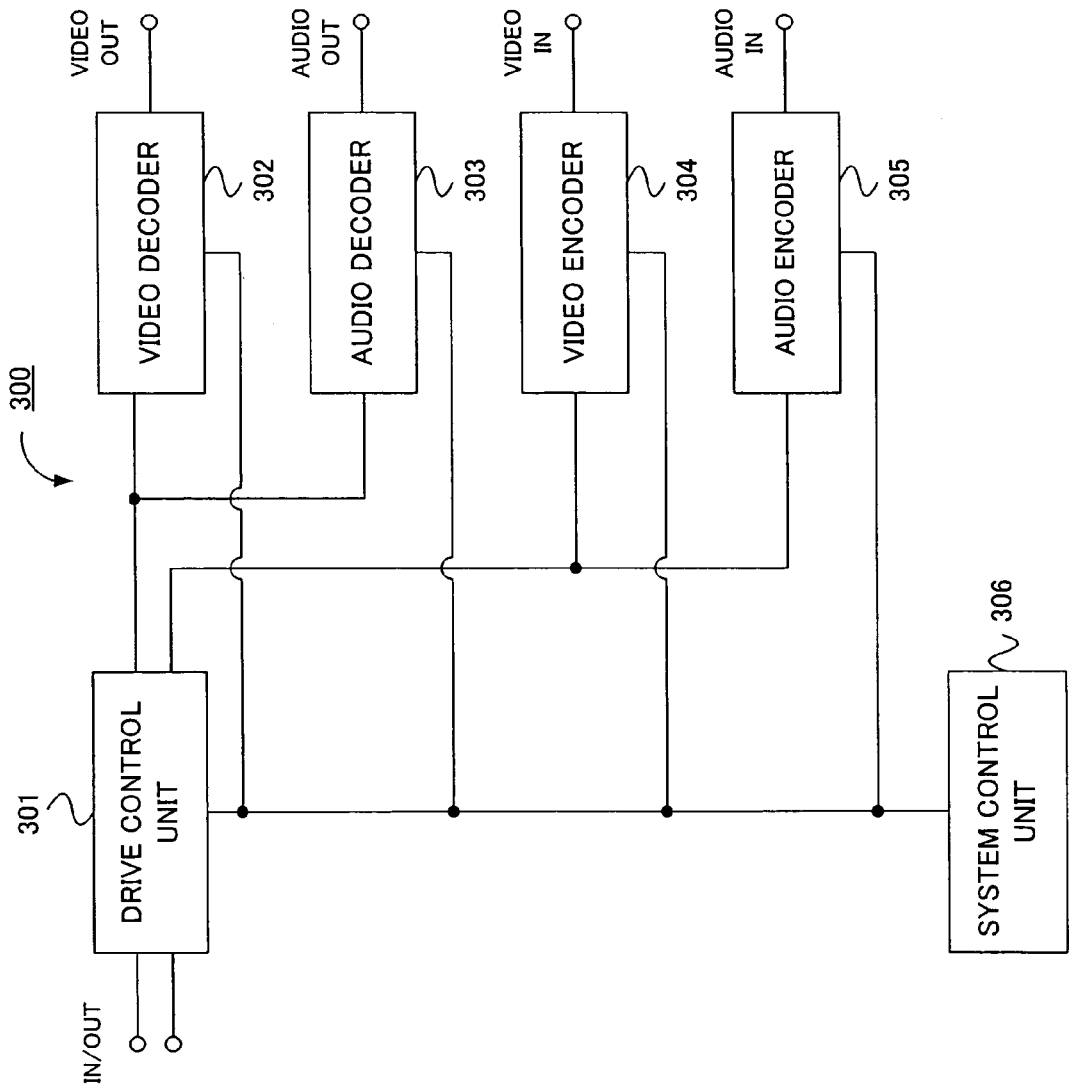
FIG. 5 is a block diagram showing a back end of the information recording and reproducing apparatus shown in FIG. 3.

As shown in FIG. 5, the back end 300 includes a drive control unit 301, a video decoder 302, an audio decoder 303, a video encoder 304, an audio encoder 305 and a system control unit 306.

The drive control unit 301 is a circuit which controls a reading process and a recording process of the disc drive 200. The back end 300 and the disc drive 200 perform, in cooperation with each other, an operation of reading out the recording information from the optical disc 100 to reproduce it, and an operation of receiving the information to be recorded from outside to record it on the optical disc 100. The drive control unit 301 realizes the cooperation between the back end 300 and the disc drive 200 by controlling the reading process and the recording process of the disc drive 200. Concretely, the drive control unit 301 outputs, to the disc drive 200, the request command about reproduction, recording and outputting of the recording information from the buffer 206.

Further, in the present embodiment, the drive control unit 301 can also perform the input and output control for controlling input or output of the control information detecting unit 209 and the control information updating unit 210, identically to the above-mentioned CPU 213.

The video decoder 302 and the audio decoder 303 demodulate recording data, which is read out from the optical disc 100 by the disc drive 200 and is supplied via the drive control unit 301, to convert it in a reproducible state by a display, a speaker and the like.

The video encoder 304 and the audio encoder 305 are circuits which receive a picture signal and a sound signal, which are inputted from outside in order to be recorded on the optical disc 100, and which encode the signals by an MPEG encoding system to supply them to the disc drive 200 via the drive control unit 301, respectively.

At the time of the reproduction, the system control unit 306 is a circuit which controls the drive control unit 301, the video decoder 302 and the audio decoder 303 and which executes the reproducing process of the recorded data in cooperation with the units. At the time of the recording, the system control unit 306 controls the drive control unit 301, the video encoder 304 and the audio encoder 305, and executes the recording process of the recording data in cooperation with those units. In addition, at the time of the reproduction and the recording, the system control unit 306 can execute control (e.g., generation and transmission of various request commands, receiving a response signal and the like) to the disc drive 200 with the drive control unit 301 in order to realize the cooperation with the disc drive 200 and the back end 300.

[Recording Process of Control Information]

Figure 6:
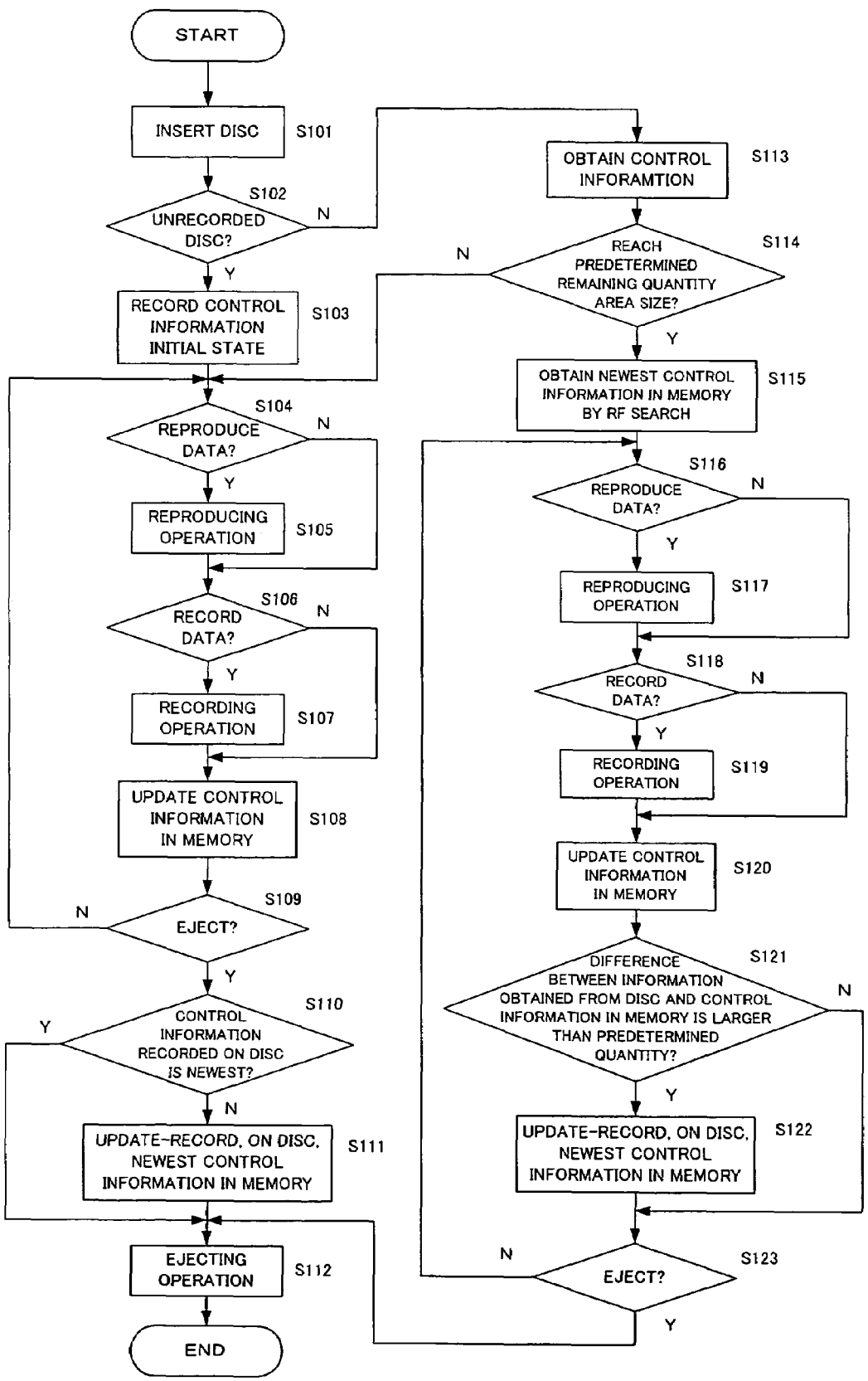
FIG. 6 is a flow chart showing a procedure for recording control information according to the present invention.

Next, the description will be given of a recording process of the control information according to the present invention, which is executed in the above-mentioned information recording and reproducing apparatus 400. FIG. 6 shows a flow chart showing a procedure thereof. Mainly, by determining whether the control information data 105 reaches the predetermined remaining quantity area 106 or not, and whether the additional recording data is larger than the predetermined quantity or not, the CPU 213 executes the process of recording the control information data on the basis of the determined result.

The concrete process will be explained with reference to FIG. 6, below.

First, in step S101, the optical disc 100, such as the DVD-R and the like, is inserted into the information recording and reproducing apparatus 400. In step S102, the CPU 213 determines whether the optical disc 100 is an unrecorded disc or not.

When the optical disc 100 is an unrecorded disc (step S102; Yes), the process goes to step S103, and the CPU 213 records a control information initial state in the control information area 104 on the optical disc 100. Then, the process goes to step S104.

In step S104, the CPU 213 determines whether the instruction of reproducing the data is given by the user and the like or not. When the instruction of reproducing the data is given (step S104; Yes), the process goes to step S105, and the CPU 213 executes the reproducing operation of the data to be reproduced. After the reproducing operation ends, the process goes to step S106. When the instruction of reproducing the data is not given (step S104; No), the CPU 213 does not execute the reproducing operation, and the process goes to step S106.

In step S106, the CPU 213 determines whether the instruction of recording the data is given by the user and the like or not. When the instruction of reproducing the data is given (step S106; Yes), the process goes to the step S107, and the CPU 213 executes the recording operation for recording the above-mentioned reproducing data. After the recording operation ends, the process goes to step S108. When the instruction of recording the data is not given (step S106; No), the CPU 213 does not execute the recording operation, and the process goes to step S108.

In step S108, the CPU 213 updates the control information data 105 which is stored in the memory (not shown) in the CPU 213. When the CPU 213 executes the recording operation in step S107, the control information data 105 in the memory is different from the newest data. However, when the CPU 213 does not execute the recording operation, the control information data 105 in the memory is identical to the newest data. When the above-mentioned process ends, the process goes to step S109.

In step S109, the CPU 213 or the drive control unit 301 determines whether a command of ejecting the optical disc 100 is issued by the user and the like or not. When the command of ejecting the optical disc 100 is issued (step S109; Yes), since the CPU 213 has to record the newest control information data 105 on the optical disc 100, the process goes to step S110, and the subsequent process is executed. On the other hand, when the command of ejecting the optical disc 100 is not issued (step S109; No), the CPU 213 does not execute the process, such as the additional recording of the control information data 105, and the process returns to step S104.

In step S110, the CPU 213 determines whether the control information data 105 recorded on the optical disc 100 is identical to the control information data 105 stored in the memory or not. The control information detecting unit 209 detects the control information data 105 on the optical disc 100. If the optical disc 100 is only inserted and ejected without being recorded, the control information data 105 recorded on the optical disc 100 is identical to the control information data 105 stored in the memory. Since the CPU 213 does not have to record the control information data 105 in that case, the CPU 213 performs the above-mentioned determination in step S110.

When the control information data 105 recorded on the optical disc 100 is not identical to the control information data 105 stored in the memory (step S110; No), the process goes to step S111. Since the recording operation of the data is executed to the optical disc 100, the control information data 105 which is stored in the memory is recorded in the control information area 104 on the optical disc 100 in step S111. The above-mentioned control information updating unit 210 and the like can perform the operation. When the above-mentioned process ends, the process goes to step S112, and the operation of ejecting the optical disc 100 is performed.

When the control information data 105 recorded on the optical disc 100 is identical to the control information data 105 stored in the memory (step S110; Yes), since the recording operation of the data to the optical disc is not performed, the control information data 105 is not recorded, and the process goes to step S112. In step S112, the operation of ejecting the optical disc 100 is performed.

On the other hand, when the inserted optical disc 100 is not an unrecorded disc (step S102; No), the process goes to step S113.

First, in step S113, the control information detecting unit 209 obtains the control information data 105 which is recorded in the control information area 104 on the optical disc 100. The obtained control information data 105 can be stored in the memory in the CPU 213. When the above-mentioned process ends, the process goes to step S114.

In step S114, the CPU 213 determines whether the obtained control information data 105 reaches the predetermined remaining quantity area 106 or not. In the present invention, the CPU 213 performs the above-mentioned determination so that the consumption of the recording capacity of the control information area 104 can be suppressed and the newest control information can be immediately obtained in inserting the optical disc 100.

When the control information data 105 does not reach the predetermined remaining quantity area 106 (step S114; No), since the control information area 104 has remaining storage capacity, the CPU 213 can record the control information data 105 for each recording of the data. Therefore, the process goes to step S104, and the process identical to the process executed to the unrecorded disc is executed. Namely, after the data is recorded on the optical disc 100, the CPU 213 records the control information data 105 in the control information area 104 every time the disc is ejected.

On the other hand, when the control information data 105 reaches the predetermined remaining quantity area 106 (step S114; Yes), the process goes to step S115. In step S115, by controlling the servo circuit 204 and the like and searching the RF signal (RF search), the CPU 213 obtains the newest control information data 105 and records it in the memory. Since the control information data 105 reaches the predetermined remaining quantity area 106, as described above, the control information data 105 corresponding to all the recording data is not necessarily recorded in the control information area 104. Thus, the real newest control information data has to be obtained by searching not only the data recorded in the control information area 104 but also other data. Therefore, the CPU 213 executes the process in step S115. When the CPU 213 ends the process of obtaining the newest control information data and recording it in the memory, the process goes to step S116.

In step S116, the CPU 213 determines whether the instruction of reproducing the data is given by the user and the like or not. When the instruction of reproducing the data is given (step S116; Yes), the process goes to step S117, and the operation of reproducing the data to be reproduced is performed. After the reproducing operation ends, the process goes to step S118. When the instruction of reproducing the data is not given (step S116; No), the reproducing operation is not performed, and the process goes to step S118.

In step S118, the CPU determines whether the instruction of recording the data is given by the user and the like or not. When the instruction of reproducing the data is given (step S118; Yes), the process goes to step S119, and the operation of recording the data is performed. After the recording operation ends, the process goes to step S120. When the instruction of recording the data is not given (step S118; No), the recording operation is not performed, and the process goes to step S120.

In step S120, the CPU 213 updates the control information data 105 stored in the memory in the CPU 213 to be the newest control information data, and the process goes to step S121.

In step S121, the CPU 213 compares the control information data 105 recorded on the optical disc 100 and the control information data 105 updated in step S120. Concretely, the CPU 213 calculates a difference value between the additional recording data 108 based on the control information data 105 recorded on the optical disc 100 and the additional recording data 108 based on the control information data 105 stored in the memory. In step S121, the CPU 213 determines whether the difference value is larger than the predetermined quantity or not. The process concretely executed is that the CPU 213 calculates the difference between the LRA(n) which is the address of the back end portion of the additional recording data 108 and the LRA(n-1) which is the previous control information data 105 recorded on the optical disc (i.e., the difference value corresponds to the recording capacity of the additional recording data) in FIG. 1 to perform the determination. In the present invention, after the control information data 105 reaches the predetermined remaining quantity area 106, when the recording capacity of the additional recording data 108 is smaller than the predetermined quantity, the useless consumption of the storage capacity of the information recording medium is suppressed by not recording the control information data. Therefore, the CPU 213 performs the above-mentioned determination.

When the recording capacity of the additional recording data 108 is larger than the predetermined quantity (step S121; Yes), the process goes to step S122. In step S122, the CPU 213 records the control information data 105 stored in the memory in the control information area 104 on the optical disc 100. It is noted that the control information updating unit 210 and the like can perform the operation. When the process in step S122 ends, the process goes to step S123.

On the other hand, when the recording capacity of the additional recording data 108 is smaller than the predetermined quantity (step S121; Yes), the CPU 213 does not record the control information data 105 in the control information area 104 on the optical disc 100, and the process goes to step S123.

In step S123, the CPU 213 or the drive control unit 301 determines whether the command of ejecting the optical disc 100 is issued by the user and the like or not. When the command of ejecting the optical disc 100 is issued (step S123; Yes), the process goes to step S112, and the operation of ejecting the optical disc 100 is performed. On the other hand, when the command of ejecting the optical disc 100 is not issued (step S123; No), the process returns to step S116, and the identical process is repeated.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-314737 filed on Sep. 5, 2003 including the specification, claims, drawings and summary is incorporated herein by reference in its entirety.

What is claimed is:

1. An information recording medium comprising:
a user data area which has a first predetermined capacity and in which user data is recorded; and
a control information area which has a second predetermined capacity and in which control information data for controlling reproduction of the user data recorded in the user data area is recorded,
wherein the control information area includes a predetermined remaining quantity area in which, after the control information data recorded in the control information area becomes larger than a first predetermined fixed amount, the control information data is recorded,
wherein the control information data is recorded in the control information area regardless of a data amount of the user data additionally recorded in the user data area until the control information data recorded in the control information area becomes larger than the first predetermined fixed amount, and wherein the control information data is recorded in the control information area only when the data amount of the user data additionally recorded in the user data area is larger than a second predetermined fixed amount after the control information data recorded in the control information area becomes larger than the first predetermined fixed amount.

2. The information recording medium according to claim 1, wherein, until the control information data recorded in the control information area becomes larger than a first predetermined fixed amount, the control information data is recorded in the control information area every time when the information recording medium is ejected.

3. An information recording apparatus which records information on an information recording medium comprising a user data area which has a first predetermined capacity and in which user data is recorded; and a control information area which has a second predetermined capacity and in which control information data for controlling reproduction of the user data recorded in the user data area is recorded, the information recording apparatus comprises:

a user data recording unit which additionally records user data in the user data area; and a control information data recording unit which additionally records, in the control information area, control information data corresponding to the user data recorded in the user data area, wherein the control information data recording unit records the control information data in the control information area regardless of a data amount of the user data additionally recorded in the user data area until the control information data recorded in the control information area becomes larger than a first predetermined fixed amount, and records the control information data in the control information area only when the data amount of the user data additionally recorded in the user data area is larger than a second predetermined fixed amount after the control information data recorded in the control information area becomes larger than the first predetermined fixed amount.

4. The information recording apparatus according to claim 3, wherein, until the control information data recorded in the control information area becomes larger than a first predetermined fixed amount, the control information data recording unit records the control information data in the control information area every time when the information recording medium is ejected.

5. The information recording apparatus according to claim 4, wherein the control information data recording unit cancels recording of the control information data if the control information data recorded on the information recording medium is newest control information data at the time when the information recording medium is ejected.

6. An information recording method of recording information on an information recording medium comprising a user data area which has a first predetermined capacity and in which user data is recorded; and a control information area which has a second predetermined capacity and in which control information data for controlling reproduction of the user data recorded in the user data area is recorded, the information recording method comprising:

a user data recording process which additionally records the user data in the user data area; and a control information data recording process which additionally records, in the control information area, the control information data corresponding to the user data recorded in the user data area, wherein the control information data recording process records the control information data in the control information area regardless of a data amount of the user data additionally recorded in the user data area until the control information data recorded in the control information area becomes larger than a first predetermined fixed amount, and records the control information data in the control information area only when the data amount of the user data additionally recorded in the user data area is larger than a second predetermined fixed amount after the control information data recorded in the control information area becomes larger than the first predetermined fixed amount.

7. A computer code/program encoded on a computer-readable medium executed by an information recording apparatus to record information on an information recording medium comprising a user data area which has a first predetermined capacity and in which user data is recorded; and a control information area which has a second predetermined capacity and in which control information data for controlling reproduction of the user data recorded in the user data area is recorded, the computer program product in the computer-readable medium comprising:

a user data recording unit which additionally records user data in the user data area; and a control information data recording unit which additionally records, in the control information area, control information data corresponding to the user data recorded in the user data area, wherein the control information data recording unit records the control information data in the control information area regardless of a data amount of the user data additionally recorded in the user data area until the control information data recorded in the control information area becomes larger than a first predetermined fixed amount, and records the control information data in the control information area only when the data amount of the user data additionally recorded in the user data area is larger than a second predetermined fixed amount after the control information data recorded in the control information area becomes larger than the first predetermined fixed amount.

* * * * *